(12) United States Patent
Funakoshi

(10) Patent No.: US 6,430,236 B1
(45) Date of Patent: Aug. 6, 2002

(54) DIGITAL BROADCASTING RECEIVER

(75) Inventor: Hideaki Funakoshi, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/217,812

(22) Filed: Dec. 22, 1998

(51) Int. Cl.⁷ ................................................. G06F 9/00
(52) U.S. Cl. ..................... 375/340; 709/104; 455/186.1; 375/349
(58) Field of Search .................. 375/340, 349, 375/260, 316; 455/418, 419, 3.2, 4.2, 6.1, 188.1, 190.1, 337, 133, 140, 141, 186.1; 709/104

(56) References Cited

U.S. PATENT DOCUMENTS

| | | | | |
|---|---|---|---|---|
| 6,072,994 A | * | 6/2000 | Phillips et al. | 455/84 |
| 6,115,434 A | * | 9/2000 | Mizobata et al. | 375/340 |
| 6,151,354 A | * | 11/2000 | Abbey | 375/211 |
| 6,167,099 A | * | 12/2000 | Rader et al. | 375/347 |
| 6,181,734 B1 | * | 1/2001 | Palermo | 375/219 |

FOREIGN PATENT DOCUMENTS

JP  6-54011  2/1994

* cited by examiner

Primary Examiner—Chi Pham
Assistant Examiner—Dung X. Nguyen
(74) Attorney, Agent, or Firm—Crowell & Moring LLP

(57) ABSTRACT

A digital broadcasting receiver capable of receiving a plurality of types of digital broadcasting, for example, digital satellite broadcasting, digital ground wave broadcasting and digital CATV broadcasting. The digital broadcasting receiver includes a software utilizing demodulating section for demodulating a digitized intermediate-frequency signal, a memory for storing software to be used in the software utilizing demodulating section so that each digital broadcasting capable of being received is demodulated, and a control section for giving a command to the software utilizing demodulating section so that the software for demodulating each digital broadcasting is selectively used by the software utilizing demodulating section according to a setting made by a remote control transmitting unit or a key input section which is a setting input section.

3 Claims, 2 Drawing Sheets

DIGITAL BROADCASTING RECEIVER

BACKGROUND OF THE INVENTION

1. Field of the Invention

The present invention relates to a digital broadcasting receiver capable of receiving signals of not less than two types of digital broadcasting among digital satellite broadcasting, digital ground wave broadcasting and digital CATV broadcasting.

2. Description of the Related Art

As shown in FIG. 2, a conventional digital broadcasting receiver includes: a tuner 100 for converting a digital satellite broadcasting signal into an intermediate-frequency signal; a tuner 110 for converting a digital ground wave broadcasting signal into an intermediate-frequency signal; a tuner 120 for converting a digital CATV broadcasting signal into an intermediate-frequency signal; A/D converters 200, 200, 200 for digitizing the intermediate-frequency signals respectively sent from the tuners 100, 110, 120; a satellite broadcasting demodulating section 350 for demodulating a digital signal sent from the first A/D converter 200; a ground wave broadcasting demodulating section 360 for demodulating a digital signal sent from the second A/D converter 200; a CATV broadcasting demodulating section 370 for demodulating a digital signal sent from the third A/D converter 200; a changeover switch 450 for selecting one of the signals sent from the satellite broadcasting demodulating section 350, the ground wave broadcasting demodulating section 360 and the CATV broadcasting demodulating section 370; a transport 500 for separating and dividing the signal selected by the changeover switch 450; a decoder 600 for decoding the signal sent from the transport 500; and a CRT 700 for displaying an image of the signal sent from the decoder 600.

The conventional digital broadcasting receiver 5 further includes: a control section 810 for controlling the tuners 100, 110, 120, the changeover switch 450 and the transport 500; a key input section 860 which is one of the setting input sections of the control section 810; and a remote control receiving section 850 for receiving the signals sent from a remote control transmitting unit 900 which is the other setting input section and which is provided separately from the digital broadcasting receiver 5.

For example, as disclosed in Japanese Patent Unexamined Publication No. Hei. 6-54011, a QPSK demodulating circuit of the satellite broadcasting demodulating section 350, by which a pure demodulating function can be exhibited, includes: five multipliers; three filters; a 90° phase shifter; a voltage-controlled oscillator; a clock regenerating circuit; two waveform shaper; and a subtracter, wherein all of them can be realized as digital circuits.

Of course, an error corrector, which is the residual function of the satellite broadcasting demodulating section 350, can be also realized as a digital circuit.

On the other hand, although not described in the above publication, the ground wave broadcasting demodulating section 360 is composed of an 8-value VSB demodulator or an OFDM demodulator and an error corrector, wherein all of them can be realized as digital circuits. The CATV broadcasting demodulating section 370 is composed of a 16-value VSB demodulator or a 256-value QAM demodulator and an error corrector, wherein all of them can be realized as digital circuits.

In the above publication, attention is paid to a portion of hardware which is common between the QPSK demodulating circuit and the MSK demodulating circuit, and a method of reducing hardware is disclosed as an invention.

However, in the conventional digital broadcasting receiver 5 composed in the manner described above, the satellite broadcasting demodulating section 350, the ground wave broadcasting demodulating section 360 and the CATV broadcasting demodulating section 370 are required respectively for receiving digital satellite broadcasting, ground wave broadcasting and CATV broadcasting. Therefore, the number of necessary parts is necessarily increased and the manufacturing cost is raised.

When the method described in the above publication is adopted to reduce hardware, it is possible to decrease the number of necessary parts and reduce the manufacturing cost, however, the decrease of the number of necessary parts is limited because attention is paid only to hardware.

SUMMARY OF THE INVENTION

It is an object of the present invention to provide a digital broadcasting receiver, the number of necessary parts of which is decreased so that the manufacturing cost can be reduced.

In order to achieve the above object, the present invention provides a digital broadcasting receiver capable of receiving a plurality of types of digital broadcasting, comprising: a software utilizing demodulating section for demodulating a digitized intermediate-frequency signal; a memory for storing software to be used in the software utilizing demodulating section so that each digital broadcasting capable of being received is demodulated; and a control section for giving a command by which the software to demodulate each digital broadcasting is selectively taken from the memory into a memory which is built in the software utilizing demodulating section according to a setting made by a setting input section.

DETAILED DESCRIPTION OF THE PREFERRED EMBODIMENT

Figure 1:
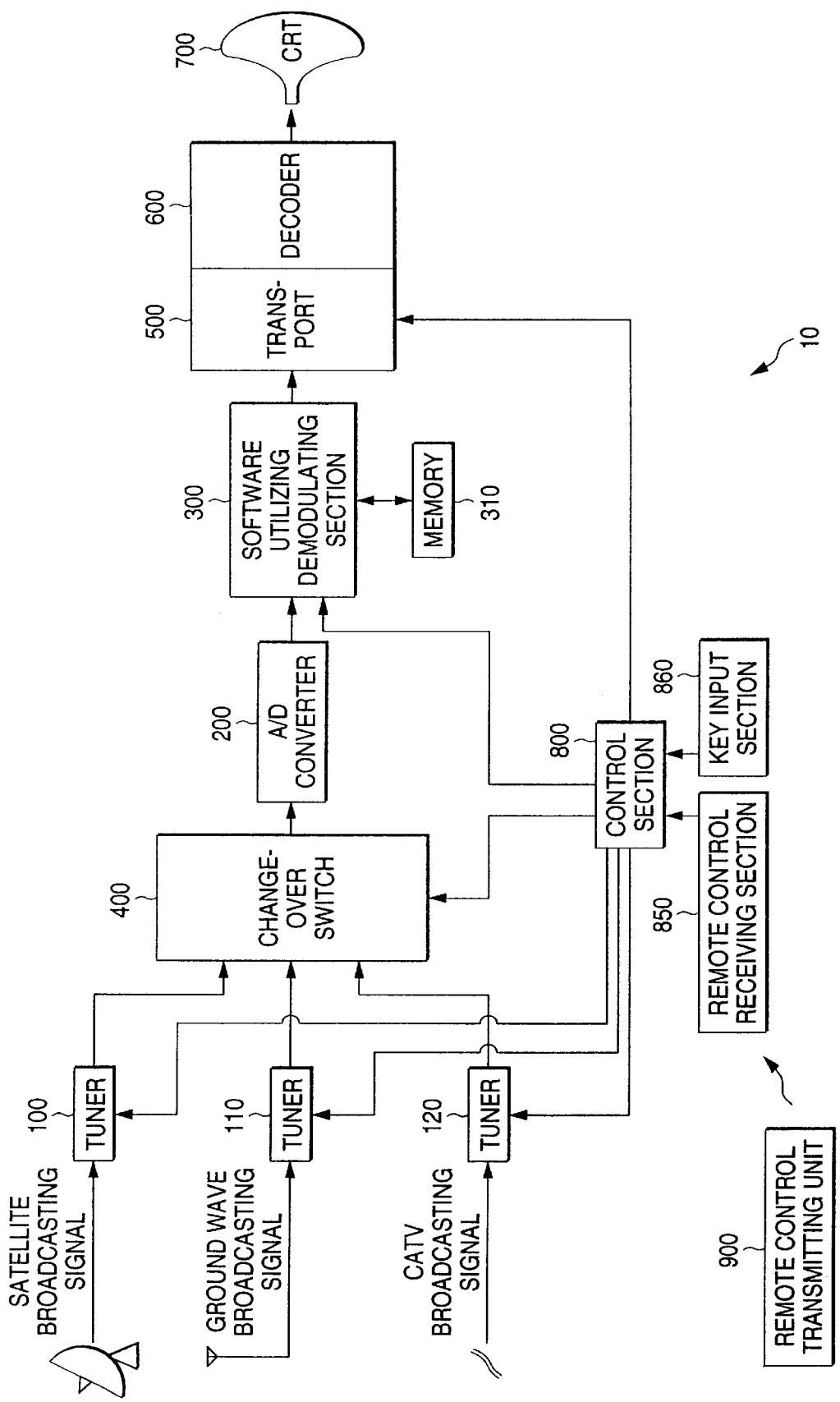
FIG. 1 is a block diagram schematically showing a digital broadcasting receiver of an embodiment of the present invention.
Figure 2:
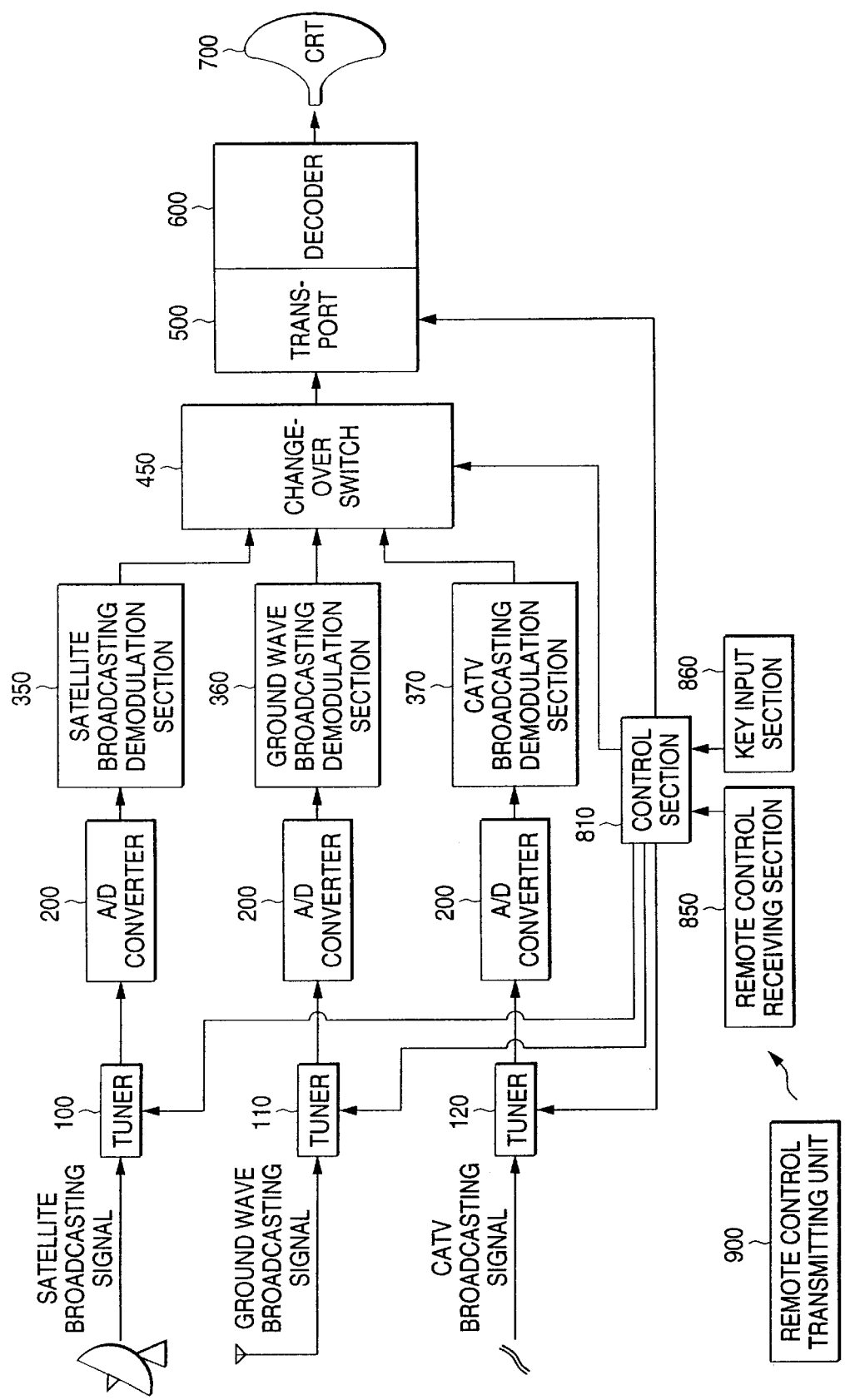
FIG. 2 is a block diagram schematically showing a conventional digital broadcasting receiver.

Referring to FIG. 1, an embodiment of a digital broadcasting receiver of the present invention will be described below.

FIG. 1 is a block diagram schematically showing a digital broadcasting receiver of the embodiment.

In this connection, like reference numerals are used to designate like parts which are common between the digital broadcasting receiver of this embodiment and the conventional digital broadcasting receiver 5.

The digital broadcasting receiver 10 includes: a tuner 100 for converting a digital satellite broadcasting signal into an intermediate-frequency signal; a tuner 110 for converting a digital ground wave broadcasting signal into an intermediate-frequency signal; a tuner 120 for converting a digital CATV broadcasting signal into an intermediate-frequency signal; a changeover switch 400 for selecting one of the intermediate-frequency signals sent from the tuners 100, 110, 120; an A/D converter 200 for digitizing the signal selected by the changeover switch 400; a software utilizing demodulating section 300 for demodulating (detecting) a digital signal sent from the A/D converter 200; a memory 310 attached to the outside of the software utilizing demodulating section 300; a transport 500 for separating and dividing the signal sent from the software utilizing demodulating section 300; a decoder 600 for decoding the signal sent from the transport 500; and a CRT 700 for displaying an image of the signal sent from the decoder 600.

The digital broadcasting receiver 10 further includes: a control section 800 for controlling the tuners 100, 110, 120, the changeover switch 400, the software utilizing demodulating section 300 and the transport 500; a key input section 860 which is one of the setting input sections of the control section 800; and a remote control receiving section 850 for receiving signals sent from a remote control transmitting unit 900 which is the other setting input section and which is provided separately from the digital broadcasting receiver 10.

The software utilizing demodulating section 300 is composed of a device such as a DSP which performs digital signal processing at a very high speed and which has a function of a sum of product computing unit or the like which is especially required when a filter necessary for demodulation is realized by a-digital filter.

Such a DSP used as the software utilizing demodulating section 300 is provided with a built-in memory (not shown in the drawing).

The memory 310 is a non-volatile memory or a mask ROM. In the memory 310, there are previously set software (not. shown) for demodulating the signals of digital satellite broadcasting, software (not shown) for demodulating the signals of digital ground wave broadcasting, and software (not shown) for demodulating the signals of digital CATV broadcasting.

Software,(not shown) for demodulating the signals of digital satellite broadcasting is for example, software which operates on the DSP in the same manner as that of a QPSK demodulator and an error corrector. Software (not shown) for demodulating the signals of digital ground wave broadcasting is for example, software which operates on the DSP in the same manner as that of an 8-value VSB demodulator or an OFDM demodulator and an error corrector. Software (not shown) for demodulating the signals of digital CATV broadcasting is for example, software which operates on the DSP in the same manner as that of a 16-value VSB demodulator or a 256-value QAM demodulator and an error corrector.

The control section 800 is for example, a common TV microcomputer.

The-remote control transmitting unit 900 is provided with common keys such as broadcasting selection keys (not shown) for selecting one of satellite broadcasting, ground wave broadcasting and CATV broadcasting and channel keys for selecting one of the channels.

The operation of the digital broadcasting receiver 10 composed in the above-described manner will be described below when the digital broadcasting receiver 10 is operated by the remote control transmitting unit 900 which is usually used as a primary setting input section.

For example, when satellite broadcasting is selected by the broadcasting selection keys (not shown) of the remote control transmitting unit 900, the remote control transmitting unit 900 makes a signal for broadcasting selection, and superimposes a carrier wave on the signal, and transmits a carrier-wave-superimposed signal for broadcasting selection. The remote control receiving section 850 receives the carrier-wave-superimposed signal for broadcasting selection and returns it into the signal for broadcasting selection from which the carrier wave is removed. The resultant signal is sent to the control section 800.

The control section 800 gives a command to the software utilizing demodulating section 300, by which software (not shown) to demodulate the signals of digital satellite broadcasting stored in the memory 310 can be taken into (loaded on) the built-in memory of the software utilizing demodulating section 300. In this connection, when the software utilizing demodulating section 300 takes software (not shown) for demodulation into the built-in memory, the contents in the built-in memory are previously erased.

The control section 800 directs the changeover switch 400 so that the changeover switch 400 can be set on the tuner 100 side.

Thereafter, when a channel is selected by the channel keys (not shown) of the remote control transmitting unit 900, the remote control transmitting unit 900 makes a signal for channel, superimposes a carrier wave on this signal, and transmits a carrier-wave-superimposed signal for channel. The remote control receiving section 850 receives the carrier-wave-superimposed signal for channel, and returns it into the signal for channel from which the carrier wave is removed. The resultant signal is sent to the control section 800.

According to the signal for channel, the control section 800 determines a channel group containing the channel and sends a predetermined PLL signal corresponding to the channel group to the tuner 100.

When the tuner 100 receives this predetermined PLL signal, it converts the channel group from the satellite broadcasting signal into an intermediate-frequency signal.

The intermediate-frequency signal is digitized by the A/D converter 200 and sent to the software utilizing demodulating section 300.

Since software (not shown) for demodulating the signals of satellite broadcasting has already been set in to the software utilizing demodulating section 300, a predetermined demodulation including an error correction can be performed.

The thus demodulated signal is sent to the transport 500. In the transport 500, signals of the unnecessary channels are removed from the signals of the channel group according to the signal for channel sent from the control section 800, and at the same time, signal of the necessary channel is extracted.

The thus extracted signal is sent to the decoder 600 and decoded. The decoded signal is sent to the CRT 700.

Due to the foregoing, a program of the predetermined channel of satellite broadcasting, which has been selected by the remote control transmitting unit 900, is displayed on the CRT 700.

According to the above operation, not only satellite broadcasting but also ground wave broadcasting and CATV broadcasting can be selected in the same manner. Therefore, the description thereof is omitted here.

As described above, a period of time of at least one second is left from the selection of a type of broadcasting to the selection of a channel conducted by the remote control transmitting unit 900, and a size of software (not shown) to for demodulation for each broadcasting is relatively small. Therefore, no problems are caused when software (not shown) used for demodulation is taken into (loaded into) the built-in memory of the software utilizing demodulating section 300.

Incidentally, in the digital broadcasting receiver 10 of the present invention, when the capacity of the built-in memory of the software utilizing demodulating section 300 is sufficiently large to hold the overall software (not shown) used for demodulation for each broadcasting, the contents of the memory 310 are taken (loaded) into the built-in memory of the software utilizing demodulating section 300, for example, when the power supply of the digital broadcasting receiver 10 is turned on. In this case, software for demodulation for each broadcasting is formed into a subroutine (block) for each broadcasting. When a command of directing software to be carried out for demodulation for one broadcasting is given to the software utilizing demodulating section 300 by the control section 800, only software for demodulation for that broadcasting is carried out.

Further, when the built-in memory of the software utilizing demodulating section 300 is a nonvolatile memory such as a flash memory or a mask ROM, software for demodulation for each broadcasting is previously set in the built-in memory when the digital broadcasting receiver 10 is shipped from a factory. In this case, the reading speed of a nonvolatile memory such as a flash memory or a mask ROM is not sufficiently high and therefore, a cache memory may be incorporated into the software utilizing demodulating section 300 as a built-in memory in addition to a nonvolatile memory or the like.

In the digital broadcasting receiver 10 of the present invention, the memory 310 may be arranged in the control section 800 or on the side of the control section 800.

In the digital broadcasting receiver 10 of the present invention, the software utilizing demodulating section 300 is a DSP, however, as long as the same performance can be exhibited, RISC, CISC or other ASCI may be used for the software utilizing demodulating section 300.

In the digital broadcasting receiver 10 of the present invention, the control section 800 is composed of a TV microcomputer, however, it is possible to use exclusive hardware for controlling at least the software utilizing demodulating section 300. Further, when the processing capacity of the software utilizing demodulating section 300 itself is sufficiently large, a portion or all of the functions of the control section 800 may be incorporated into the software utilizing demodulating section 300.

The CRT 700 is built in the digital broadcasting receiver 10 of the present invention so that it can be used as an image displaying device, however, the digital broadcasting receiver 10 of the present invention may be formed into a receiver, which does not include the CRT 700, to be connected with a monitor display or a common analog TV set.

Further, such a receiver not including the CRT 700 may be applied to the tuner section of a VCR.

Furthermore, the digital broadcasting receiver 10 of the present invention may be formed into a TVCR in which a VCR is built.

In the above description, the digital broadcasting receiver 10 of the present invention receives three types of digital broadcasting. However, it is possible to provide a digital broadcasting receiver capable of receiving two types or not less than four types of digital broadcasting in the same manner as that described above. Accordingly, the description thereof is omitted here.

As described above, the present invention provides a digital broadcasting receiver capable of receiving a plurality of types of digital broadcasting, comprising: a software utilizing demodulating section for demodulating a digitized intermediate-frequency signal; a memory for storing software to be used in the software utilizing demodulating section so that each digital broadcasting capable of being received is demodulated; and a control section for giving a command by which the software to demodulate each digital broadcasting is selectively taken from the memory into a memory built in the software utilizing demodulating section according to a setting made by a setting input section.

Therefore, in the digital broadcasting receiver of the present invention, only one software utilizing demodulating section is used while the conventional receiver uses a plurality of demodulating sections which are respectively required for the types of digital broadcasting to be received. When the software utilizing demodulating section selectively takes software for demodulation corresponding to the type of digital broadcasting to be received, from the memory in which three types of software for demodulation is stored, the function of demodulating the digital broadcasting concerned is exhibited.

Therefore, the number of necessary parts of the digital broadcasting receiver of the present invention can be made to be smaller than that of the conventional digital broadcasting receiver. Due to the foregoing, the manufacturing cost of the digital broadcasting receiver can be reduced, and also the size and weight thereof can be decreased.

What is claimed is:

1. A digital broadcasting receiver capable of receiving a plurality of types of digital broadcasting, comprising:

a software utilizing demodulating section for demodulating a digitized intermediate-frequency signal;

a memory for storing a plurality of software corresponding to the plurality of types of digital broadcasting to be used in said software utilizing demodulating section so that each digital broadcasting capable of being received is demodulated; and a control section for giving a command by which the software to demodulate each digital broadcasting is selectively taken from said memory into a memory which is built in said software utilizing demodulating section according to a setting made by a setting input section.

2. The digital broadcasting receiver according to claim 1, wherein said memory and said software utilizing demodulating section are integrated with each other, and said control section gives a command to said software utilizing demodulating section so that the software to demodulate each digital broadcasting is selectively used.

3. The digital broadcasting receiver according to claim 1, further comprising a plurality of tuners corresponding to the plurality of types of digital broadcasting, a changeover switch for selecting one of intermediate-frequency signals sent from said tuners, and an A/D converter for digitizing the intermediate-frequency signal selected by said changeover switch to send the digitized intermediate-frequency signal to said software utilizing demodulating section.

* * * * *